United States Patent
Yamashita

(10) Patent No.: US 12,545,070 B2
(45) Date of Patent: Feb. 10, 2026

(54) SUSPENSION SYSTEM AND CONTROLLER

(71) Applicant: Hitachi Astemo, Ltd., Hitachinaka (JP)

(72) Inventor: Mikio Yamashita, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 33 days.

(21) Appl. No.: 18/692,593

(22) PCT Filed: Sep. 20, 2022

(86) PCT No.: PCT/JP2022/034869
§ 371 (c)(1),
(2) Date: Mar. 15, 2024

(87) PCT Pub. No.: WO2023/054038
PCT Pub. Date: Apr. 6, 2023

(65) Prior Publication Data
US 2025/0128564 A1    Apr. 24, 2025

(30) Foreign Application Priority Data
Sep. 29, 2021 (JP) ................... 2021-159589

(51) Int. Cl.
 *B60G 17/08* (2006.01)
 *B60G 17/0165* (2006.01)
(52) U.S. Cl.
 CPC ......... *B60G 17/08* (2013.01); *B60G 17/0165* (2013.01); *B60G 2202/24* (2013.01);
 (Continued)
(58) Field of Classification Search
 CPC ............... B60G 17/08; B60G 17/0165; B60G 2202/24; B60G 2204/62; B60G 2400/91;
 (Continued)

(56) References Cited

U.S. PATENT DOCUMENTS 5,133,574 A * 7/1992 Yamaoka ......... B60G 17/01941
 280/5.519
5,142,475 A * 8/1992 Matsunaga ...... B60G 17/01941
 280/5.515
(Continued)

FOREIGN PATENT DOCUMENTS

| JP | 5-319066 | 12/1993 |
| JP | 2003-104024 | 4/2003 |
| JP | 2015-83469 | 4/2015 |

OTHER PUBLICATIONS

International Search Report issued Dec. 6, 2022 in International (PCT) Application No. PCT/JP2022/034869, with English-language Translation.

(Continued)

*Primary Examiner* — Logan M Kraft
*Assistant Examiner* — John D Bailey
(74) *Attorney, Agent, or Firm* — Wenderoth, Lind & Ponack, L.L.P.

(57) ABSTRACT

A suspension system includes: a variable damper configured to use a damping force variable actuator to adjust communication of working fluid generated in a passage by a relative movement between a vehicle body and a wheel, to thereby adjust a damping force over a range of a soft characteristic to a hard characteristic; and a controller configured to control the damping force variable actuator. The variable damper further includes a frequency response unit configured to reduce the damping force for vibration at a specific frequency. The controller is configured to increase a change rate from a soft side to a hard side at a time of controlling the damping force to reach a target damping force when a frequency of the relative movement between the vehicle body and the wheel is lower than a first frequency set to the frequency response unit.

8 Claims, 12 Drawing Sheets

(52) U.S. Cl.
CPC ...... *B60G 2204/62* (2013.01); *B60G 2400/91* (2013.01); *B60G 2500/104* (2013.01); *B60G 2600/182* (2013.01); *B60G 2600/604* (2013.01); *B60G 2800/162* (2013.01); *B60G 2800/916* (2013.01)

(58) Field of Classification Search
CPC ........ B60G 2500/104; B60G 2600/182; B60G 2600/604; B60G 2800/162; B60G 2800/916
USPC .......................................................... 701/37
See application file for complete search history.

(56) References Cited

U.S. PATENT DOCUMENTS

| | | | | |
|---|---|---|---|---|
| 5,142,477 | A * | 8/1992 | Tsutsumi | B60G 17/0165 280/5.515 |
| 5,400,245 | A * | 3/1995 | Butsuen | B60G 17/018 280/124.102 |
| 5,460,355 | A * | 10/1995 | Danek | F16F 9/516 267/221 |
| 6,427,986 | B1 * | 8/2002 | Sakai | B60G 17/0416 188/282.4 |
| 10,106,009 | B2 * | 10/2018 | Hirao | B60G 17/08 |
| 11,331,973 | B2 * | 5/2022 | Krämer | F16F 9/185 |
| 2012/0160620 | A1 * | 6/2012 | Yamashita | B60G 13/08 188/266.5 |
| 2012/0247888 | A1 * | 10/2012 | Chikuma | B60G 17/08 701/38 |
| 2016/0059663 | A1 * | 3/2016 | Teraoka | F16F 9/187 188/266.2 |
| 2016/0229254 | A1 * | 8/2016 | Teraoka | B60G 13/08 |
| 2016/0229255 | A1 * | 8/2016 | Teraoka | F16F 9/50 |
| 2016/0281815 | A1 * | 9/2016 | Teraoka | F16F 9/061 |
| 2016/0288605 | A1 * | 10/2016 | Teraoka | B60G 13/08 |
| 2018/0223940 | A1 * | 8/2018 | Kim | B60G 17/08 |
| 2022/0082149 | A1 * | 3/2022 | Conti | F16F 9/49 |

OTHER PUBLICATIONS

Written Opinion Of The International Searching Authority issued Dec. 6, 2022 in International (PCT) Application No. PCT/JP2022/034869, with English-language Translation.

* cited by examiner

SUSPENSION SYSTEM AND CONTROLLER

TECHNICAL FIELD

The present disclosure relates to a suspension system and a controller installed on a vehicle such as an automobile.

BACKGROUND ART

In general, a shock absorber is provided between a vehicle body side and each wheel side in a vehicle such as a four-wheeled automobile. As such a shock absorber, there is given a shock absorber having a damping force adjustable through an actuator. A suspension system disclosed in Patent Literature 1 is configured to control a damping force characteristic of a shock absorber based on a vehicle behavior estimated by a vehicle behavior estimation unit.

CITATION LIST

Patent Literature

PTL 1: JP 2015-83469 A

SUMMARY OF INVENTION

Technical Problem

Incidentally, the shock absorber disclosed in Patent Literature 1 includes a frequency response unit which reduces a damping force for vibration at a high frequency. In this configuration, a controller does not apply damping force control to the vibration at the high frequency, and applies the damping force control to only vibration at a low frequency.

However, when a cutoff frequency of the frequency response unit is set to be lower, compared with a case in which the cutoff frequency is set to be higher, there exists such a tendency that a rise of the damping force is delayed, resulting in deterioration of sprung damping performance (long-term vibration). When the sprung damping performance deteriorates as described above, a stroke of the shock absorber increases.

Solution to Problem

One of objects of the present invention is to provide a suspension system and a controller which can provide good sprung damping performance also for low-frequency vibration.

According to one embodiment of the present invention, there is provided a suspension system including: a shock absorber that includes a damping force variable mechanism configured to use an actuator to adjust communication of working fluid generated in a passage by a relative movement between a vehicle body and a wheel, to thereby adjust a damping force over a range of a soft characteristic to a hard characteristic; and a controller configured to control the actuator. The shock absorber further includes a frequency response unit configured to reduce the damping force for vibration at a specific frequency. The controller is configured to increase a change rate from a soft side to a hard side at a time of controlling the damping force to reach a target damping force when a frequency of the relative movement between the vehicle body and the wheel is lower than a first frequency set to the frequency response unit.

Further, according to one embodiment of the present invention, there is provided a controller which is configured to: control a damping force variable mechanism of a shock absorber including a frequency response unit configured to reduce a damping force for vibration at a specific frequency, the damping force variable mechanism being configured to use an actuator to adjust communication of working fluid generated in a passage by a relative movement between a vehicle body and a wheel, to thereby adjust the damping force over a range of a soft characteristic to a hard characteristic; and reduce a time for the damping force to reach from a target damping force on a soft side to that on a hard side when a frequency of the relative movement between the vehicle body and the wheel is lower than a first frequency set to the frequency response unit.

According to one embodiment of the present invention, good sprung damping performance can be provided also for low-frequency vibration.

DESCRIPTION OF EMBODIMENTS

A detailed description is now given of an example in which a suspension system and a controller according to embodiments of the present invention are applied to a four-wheeled automobile, with reference to the accompanying drawings.

Figure 1:
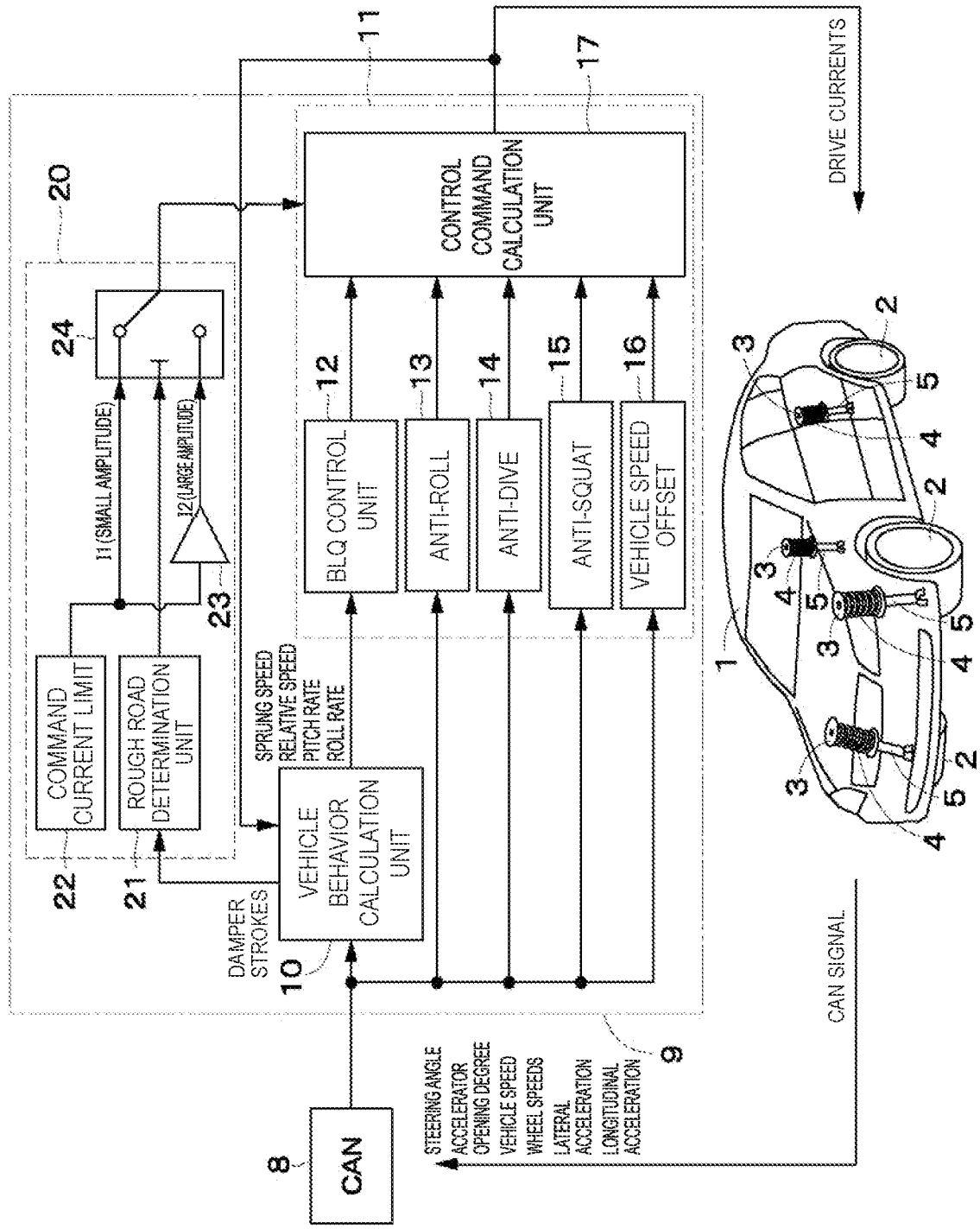
FIG. 1 is an overall configuration diagram for illustrating, together with a controller, a four-wheeled automobile to which a suspension system according to a first embodiment of the present invention has been applied.
Figure 2:
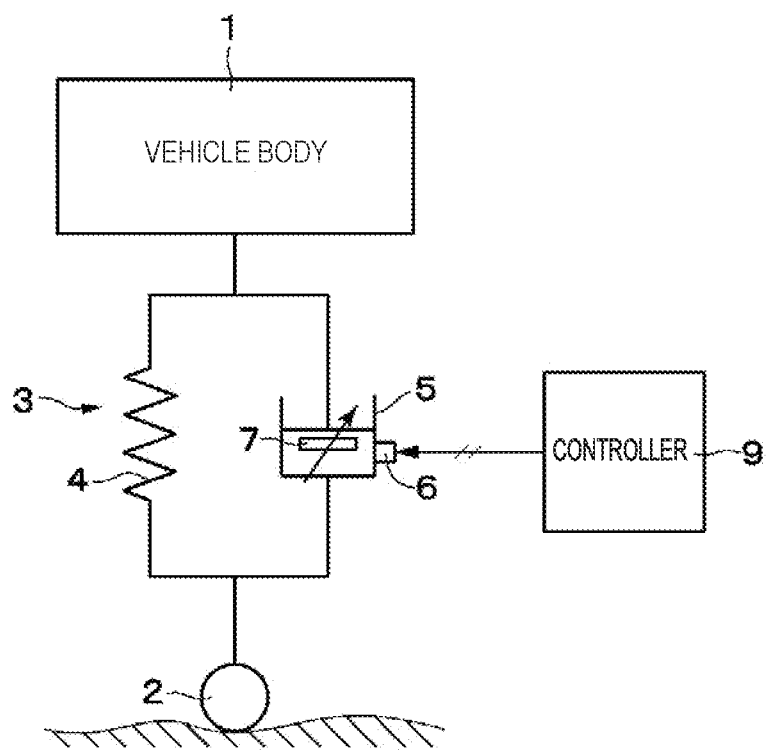
FIG. 2 is a diagram for schematically illustrating a shock absorber mounted to the automobile of FIG. 1.

FIG. 1 and FIG. 2 are each illustration of a first embodiment of the present invention. In FIG. 1, a vehicle body 1 forms a body of a vehicle. Under the vehicle body 1, there are installed, for example, left and right front wheels and left and right rear wheels (hereinafter generally referred to as "wheels 2").

A suspension device 3 is interposed between the vehicle body 1 and the wheel 2. The suspension device 3 is formed of a suspension spring 4 (hereinafter referred to as "spring 4") and a damping force adjustable shock absorber (hereinafter referred to as "variable damper 5") interposed, in a parallel relationship with the spring 4, between the vehicle body 1 and the wheel 2.

The variable damper 5 of the suspension device 3 is a damping force generation mechanism configured to generate an adjustable force between the vehicle body 1 side and the wheel 2 side. The variable damper 5 is formed through use of a hydraulic shock absorber of the damping force adjustable type. To the variable damper 5, a damping force variable actuator 6 (actuator) formed of a damping force adjustment valve or the like is attached in order to continuously adjust a characteristic (that is, damping force characteristic) of the generated damping force from a hard characteristic to a soft characteristic. The damping force variable actuator 6 adjusts communication of working fluid generated in a passage of the variable damper 5 by a relative movement between the vehicle body 1 and the wheel 2. As a result, the damping force variable actuator 6 forms a damping force variable mechanism capable of adjusting the damping force over a range of soft to hard. The damping force variable actuator 6 adjusts the damping force in accordance with a supplied current (drive current).

However, it is not always required that the damping force variable actuator 6 be configured to continuously adjust the damping force characteristic, and may be configured to adjust the damping force at a plurality of levels, for example, two or more levels. Moreover, the variable damper 5 may be of a pressure control type or a flow rate control type.

The variable damper 5 includes a frequency response unit 7 in which the damping force is adjusted in accordance with a vibration frequency between the vehicle body 1 and the wheel 2. The frequency response unit 7 is configured similarly to a frequency response unit disclosed in, for example, Patent Literature 1. That is, the frequency response unit 7 is formed of a free piston provided to a piston when a disc valve which generates the damping force of the variable damper 5 is provided to the piston.

The frequency response unit 7 reduces the damping force for vibration at a specific frequency. Specifically, the frequency response unit 7 reduces the damping force for vibration at a high frequency between the vehicle body 1 and the wheel 2. In this configuration, the damping force of the variable damper 5 is smaller in a high-frequency region with respect to a cutoff frequency fc of the frequency response unit 7 than that in a low-frequency region. The cutoff frequency fc of the frequency response unit 7 is set to a value higher than a sprung resonance frequency (for example, approximately 2 Hz) of the vehicle.

The provided position of the frequency response unit 7 is not limited to the piston of the variable damper 5, and the frequency response unit 7 may be provided to a bottom valve positioned on a bottom side of a cylinder of the variable damper 5 or may be provided to the damping force variable actuator 6 (damping force variable mechanism).

The controller area network (CAN) 8 is a serial communication unit installed in the vehicle body 1. The CAN 8 executes in-vehicle multiplexed communication between a large number of electronic devices installed in the vehicle and a controller 9. The CAN 8 transmits vehicle operation information through use of a CAN signal formed of a serial signal. In this case, examples of the vehicle operation information transmitted on the CAN 8 include a steering angle, an accelerator opening degree, a vehicle speed, wheel speeds, a lateral acceleration, a longitudinal acceleration, and the like. The CAN 8 serves as vehicle vibration acquisition means which acquires the vibration between the vehicle body 1 and each wheel 2.

The controller 9 is formed of a microcomputer and the like. The controller 9 includes a storage unit (not shown) formed of a ROM, a RAM, a nonvolatile memory, and the like. The controller 9 executes a program stored in the storage unit, to thereby control the damping forces of the variable dampers 5. As illustrated in FIG. 1 and FIG. 2, an input side of the controller 9 is connected to the CAN 8 and the like, and an output side thereof is connected to the damping force variable actuators 6 of the variable dampers 5, and the like. The controller 9 reads the vehicle operation information from the CAN 8 through the serial communication. The controller 9 includes a vehicle behavior calculation unit 10, a damping force command signal output unit 11, and a damping force change rate control unit 20.

The vehicle behavior calculation unit 10 outputs a vehicle behavior estimated based on the information (vehicle operation information) input from the CAN 8. The vehicle behavior estimated by the vehicle behavior calculation unit 10 includes, for example, sprung speeds, relative speeds (piston speeds), a pitch rate, a roll rate, and damper strokes X. To an input side of the vehicle behavior calculation unit 10, the CAN 8 and a control command calculation unit 17 are connected. To the vehicle behavior calculation unit 10, the vehicle operation information is input from the CAN 8, and command currents (drive currents) are input from the control command calculation unit 17. In this configuration, the vehicle operation information includes the piston speeds. The vehicle behavior calculation unit 10 estimates the damping forces generated by the variable dampers 5 based on the piston speeds and the command currents. Moreover, the vehicle behavior calculation unit 10 estimates the damper strokes X of the variable dampers 5 based on the information input from the CAN 8.

The damping force command signal output unit 11 outputs the command signals for currents to be supplied to the damping force variable actuators 6, based on the relative speeds (piston speeds) between the vehicle body 1 and the wheels 2, and on the vehicle behavior. The damping force command signal output unit 11 includes a BLQ control unit 12, an anti-roll control unit 13, an anti-dive control unit 14, an anti-squat control unit 15, a vehicle speed offset control unit 16, and the control command calculation unit 17.

The BLQ control unit 12 forms a ride comfort control unit which increases ride comfort of the vehicle. The BLQ control unit 12 outputs control command values based on the vehicle behavior output from the vehicle behavior calculation unit 10. Specifically, the BLQ control unit 12 calculates the control command value serving as a command signal for the current to each damping force variable actuator 6 based on the piston speed, the sprung speed, and the like of each wheel. The BLQ control unit 12 outputs, to the control command calculation unit 17, the control command values for reducing vertical sprung vibration from the stroke speeds, the sprung speeds, and the like based on, for example, the bilinear optimal control theory.

The anti-roll control unit 13, the anti-dive control unit 14, and the anti-squat control unit 15 form a maneuverability and stability control unit which increases maneuverability and stability of the vehicle. The anti-roll control unit 13 outputs control command values for suppressing roll of the vehicle. The anti-roll control unit 13 calculates the control command values in accordance with a lateral acceleration of the vehicle and outputs those control command values to the control command calculation unit 17.

The anti-dive control unit 14 outputs control command values for suppressing dive of the vehicle. The anti-dive control unit 14 calculates the control command values based on a longitudinal acceleration of the vehicle body 1 and outputs those control command values to the control command calculation unit 17.

The anti-squat control unit 15 outputs control command values for suppressing squat of the vehicle. The anti-squat control unit 15 calculates the control command values based on a longitudinal acceleration of the vehicle body 1 and outputs those control command values to the control command calculation unit 17.

The vehicle speed offset control unit 16 is a control unit which adjusts the damping forces in accordance with the vehicle speed. The vehicle speed offset control unit 16 outputs, when the vehicle speed is higher than a predetermined speed, an offset value for the control command values to the control command calculation unit 17 such that the damping forces approach the hard side as the vehicle speed increases.

To an input side of the control command calculation unit 17, the BLQ control unit 12, the anti-roll control unit 13, the anti-dive control unit 14, the anti-squat control unit 15, and the vehicle speed offset control unit 16 are connected. The control command calculation unit 17 calculates the command current as the command signal for the damping force to be output to the damping force variable actuator 6 of each variable damper 5, based on the control command values from the BLQ control unit 12, the anti-roll control unit 13, the anti-dive control unit 14, the anti-squat control unit 15, and the vehicle speed offset control unit 16 connected to each other in parallel. The damping force variable actuator 6 of each variable damper 5 variably controls a damping force characteristic continuously or at a plurality of steps between hard and soft in accordance with the command current serving as the drive current supplied from the control command calculation unit 17. The control command calculation unit 17 may output current values of the command currents as the command signals for the damping forces, and a current control unit provided outside the controller 9 may output the command currents based on those current values.

Description is now given of a specific configuration of the damping force change rate control unit 20. The damping force change rate control unit 20 increases the change rate from the soft side to the hard side at the time of control to achieve a target damping force when the frequency of the relative movement between the wheel 2 and the vehicle body 1 is a frequency (second frequency) lower than the cutoff frequency fc (first frequency) of the frequency response unit 7.

As a result of extensive study of the inventor of the present application, when the cutoff frequency fc of the frequency response unit 7 is set to be lower (for example, 10 Hz), compared with a case in which the cutoff frequency fc is set to be higher (for example, 20 Hz), it has been found that a peak of the damping force is equivalent, but a rise of the damping force is delayed, and sprung damping performance (long-term vibration) deteriorates. When the sprung damping performance deteriorates, the stroke of the variable damper 5 increases.

Thus, the damping force change rate control unit 20 increases the changer rate of the damping force from the soft side to the hard side at the time of the control to achieve the target damping force based on a damper stroke X of the variable damper 5. Specifically, the damping force change rate control unit 20 increases a change rate of the command current at the time of the control to achieve the target damping force when the damper stroke X of the variable damper 5 is longer than a predetermined value X0 determined in advance (large amplitude) compared with that at the time when the damper stroke X is shorter (small amplitude). In this configuration, the predetermined value X0 is a determination value for discriminating the large amplitude and the small amplitude from each other, and is appropriately determined through an experiment using an actual vehicle, simulation, or the like. The damping force change rate control unit 20 includes a rough road determination unit 21, a command current limit unit 22, a gain multiplication unit 23, and a current limit switching unit 24.

The rough road determination unit 21 determines whether a travel road of the vehicle is a rough road or a smooth road based on the damper stroke X estimated by the vehicle behavior calculation unit 10. Specifically, when the damper stroke X is shorter than the predetermined value X0 (X<X0), the damper stroke X has a small amplitude, and hence the rough road determination unit 21 determines that the travel road is a smooth road. When the damper stroke X is equal to or longer than the predetermined value X0 (X≥X0), the damper stroke X has a large amplitude, and hence the rough road determination unit 21 determines that the travel road is a rough road.

The command current limit unit 22 outputs a current limit value I1 determined in advance. The current limit value I1 is experimentally determined in consideration of, for example, characteristics of the variable damper 5 and the behavior of the vehicle. The gain multiplication unit 23 multiplies the current limit value I1 by a relaxation coefficient Ci, and outputs a product I2 thereof. In this configuration, the relaxation coefficient Ci is, for example, a positive real number (Ci>0).

To the current limit switching unit 24, the current limit value I1 output from the command current limit unit 22 and the product I2 obtained by multiplying the current limit value I1 by the relaxation coefficient Ci are input. In addition thereto, to the current limit switching unit 24, the determination result of the rough road determination unit 21 is input. The current limit switching unit 24 selects any one of the current limit value I1 and the product I2 in accordance with the determination result of the rough road determination unit 21, and outputs the selected one to the control command calculation unit 17. Specifically, the current limit switching unit 24 outputs the current limit value I1 when the rough road determination unit 21 determines that the travel road is a smooth road having a small amplitude. The current limit switching unit 24 outputs the product I2 when the rough road determination unit 21 determines that the travel road is a rough road having a large amplitude.

The control command calculation unit 17 limits the change rate of the command currents in accordance with the current limit value I1 when the current limit value I1 is output from the current limit switching unit 24. The control command calculation unit 17 limits the change rate of the command currents in accordance with the product I2 larger than the current limit value I1 when the product I2 is output from the current limit switching unit 24. In this configuration, the limit on the change rate of the command currents is relaxed when the product I2 is output compared with that at the time of the output of the current limit value I1.

The suspension system according to the first embodiment has the above-mentioned configuration. Description is now given of the operation thereof.

When vibration in the vertical direction occurs due to recesses and protrusions of a road surface at the time of the travel of the vehicle, the vehicle operation information including the vibration between the vehicle body 1 and each wheel 2 is input from the CAN 8 to the controller 9. In this configuration, the damping force command signal output unit 11 of the controller 9 includes the BLQ control unit 12, the anti-roll control unit 13, the anti-dive control unit 14, the anti-squat control unit 15, the vehicle speed offset control unit 16, and the control command calculation unit 17. The BLQ control unit 12 obtains the control command values for increasing the ride comfort of the vehicle based on the vehicle behavior estimated by the vehicle behavior calculation unit 10. Moreover, the anti-roll control unit 13, the anti-dive control unit 14, the anti-squat control unit 15, and the vehicle speed offset control unit 16 obtain the control command values for increasing the maneuverability and the stability of the vehicle based on the vehicle operation information input from the CAN 8. The control command calculation unit 17 outputs the command signals for the drive currents (command currents) to be supplied to the damping force variable actuators 6, based on those control command values.

Incidentally, to the variable damper 5, the frequency response unit 7 formed of the free piston is provided. In the frequency response unit 7, when vibration at a frequency higher than the cutoff frequency fc occurs between the vehicle body 1 and the wheel 2, the free piston is displaced in response to this vibration, to thereby reduce the damping force against the vibration. In this configuration, when, for example, a restriction of an introduction orifice is increased, to thereby set the cutoff frequency fc to be higher, a timing at which the free piston reaches a stroke end becomes earlier. As a result, the damping force increases even in a lower high-frequency band contributing to the ride comfort, an improvement effect on the ride comfort by the frequency response decreases, and hence an occupant of the vehicle tends to hardly experience the improvement effect on the ride comfort.

Meanwhile, for example, when the restriction of the introduction orifice is reduced, to thereby set the cutoff frequency fc to be lower, the damping force can be reduced in a still wider high frequency region than that in the case of setting the cutoff frequency fc to be higher. As a result, the improvement effect on the ride comfort by the frequency response increases, and hence the occupant of the vehicle tends to easily experience the improvement effect on the ride comfort.

The peaks of the damping force are equivalent between the case in which the cutoff frequency fc of the frequency response unit 7 is set to be lower and the case in which the cutoff frequency fc is set to be higher. However, as a result of the extensive study of the inventor of the present application, when the cutoff frequency fc of the frequency response unit 7 is set to be lower, compared with the case in which the cutoff frequency fc is set to be higher, it has been found that the rise of the damping force is delayed, and the sprung damping performance (long-term vibration) deteriorates. In this configuration, when the sprung damping performance deteriorates, the damper stroke X increases.

Thus, in this embodiment, the controller 9 increases the change rate from the soft side to the hard side at the time of the control to achieve the target damping force when the frequency of the relative movement between the wheel 2 and the vehicle body 1 is lower than the cutoff frequency fc (first frequency) of the frequency response unit 7. In this configuration, when the frequency of the relative movement between the wheel 2 and the vehicle body 1 is lower than the cutoff frequency fc of the frequency response unit 7, the sprung damping performance deteriorates, and the damper stroke X tends to increase. Thus, the damping force change rate control unit 20 of the controller 9 relaxes the limit on the change rate of the command current in the case in which the damper stroke X is equal to or longer than the predetermined value X0 (X≥X0) compared with the case in which the damper stroke X is shorter than the predetermined value X0. As a result, the controller 9 according to this embodiment can quickly increase the damping forces of the variable dampers 5 at the time of travel on a rough road in which the damper strokes X have low frequencies and large amplitudes.

Figure 3:
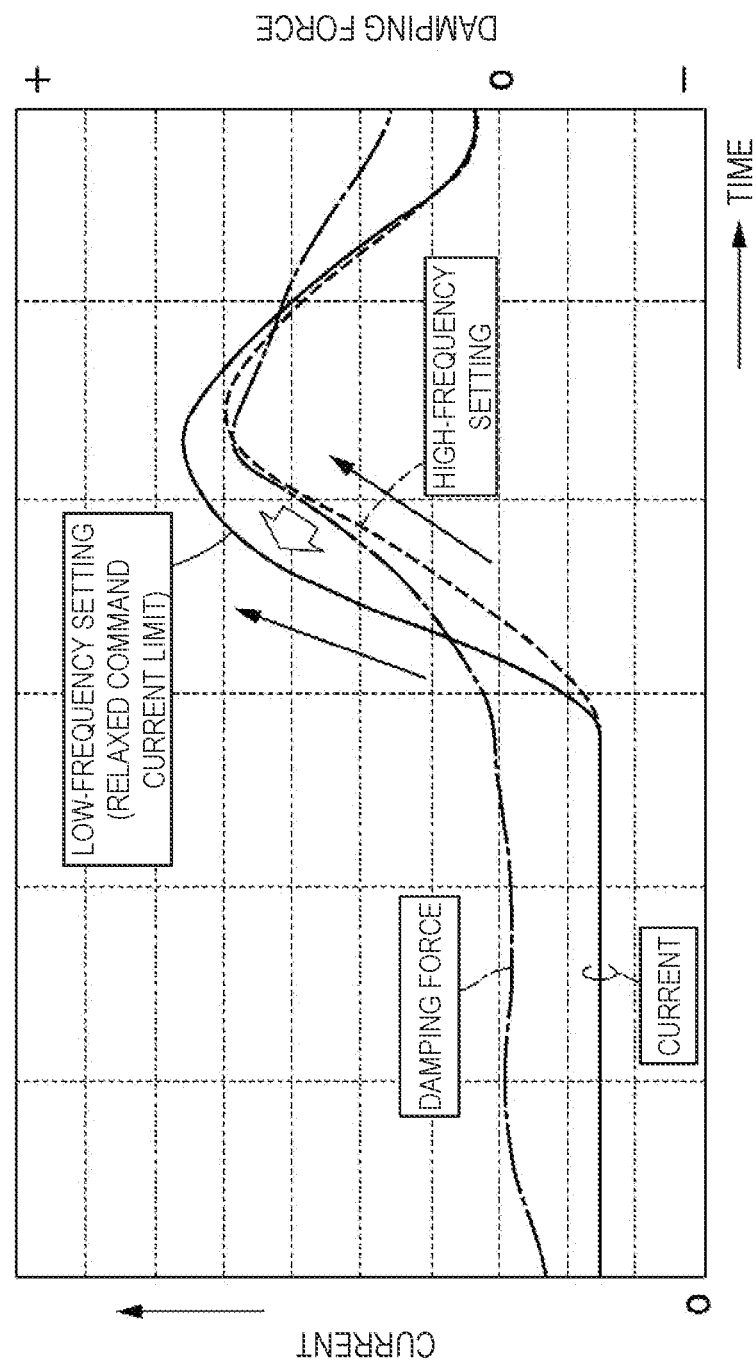
FIG. 3 is a characteristic graph for showing temporal changes in a damping force and a command current for the first embodiment and a first comparative example.
Figure 4:
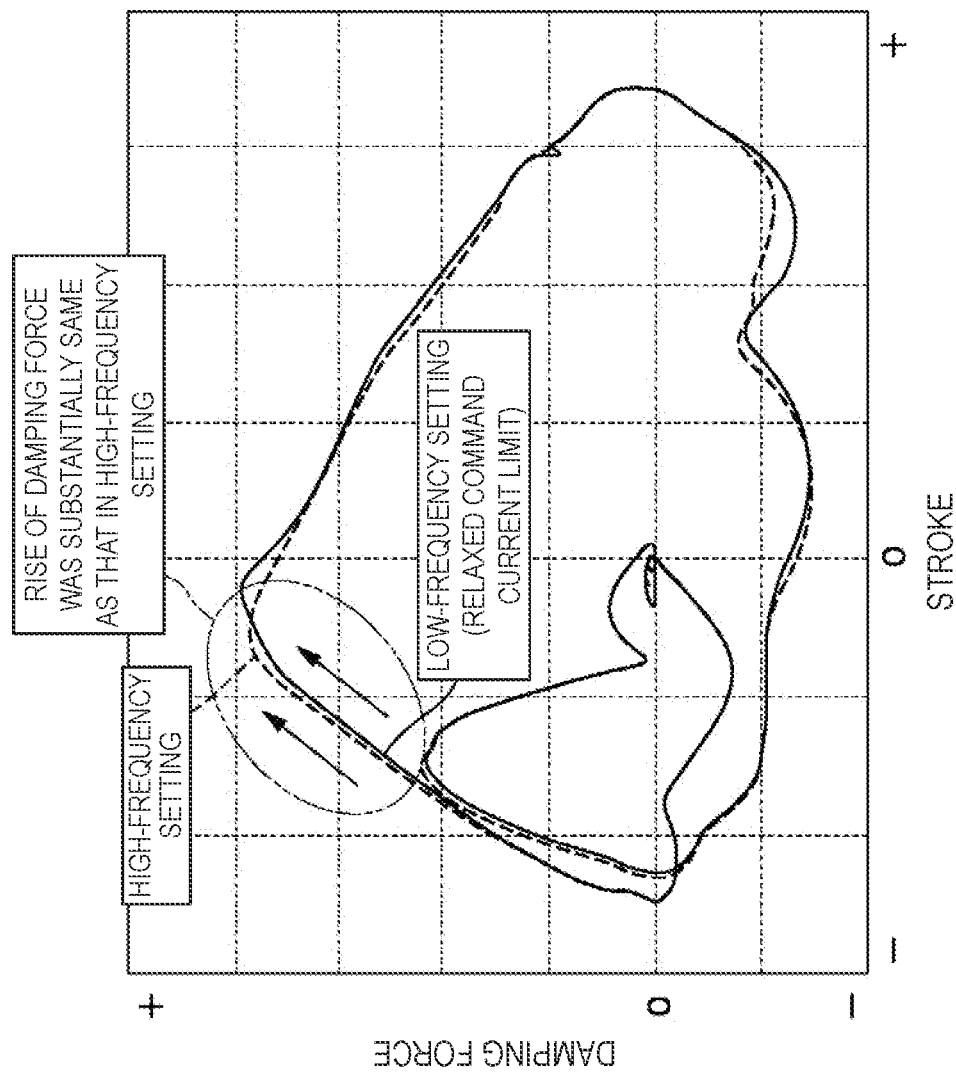
FIG. 4 is a characteristic graph for showing relationships between a stroke and a damping force of a variable damper for the first embodiment and the first comparative example.
Figure 5:
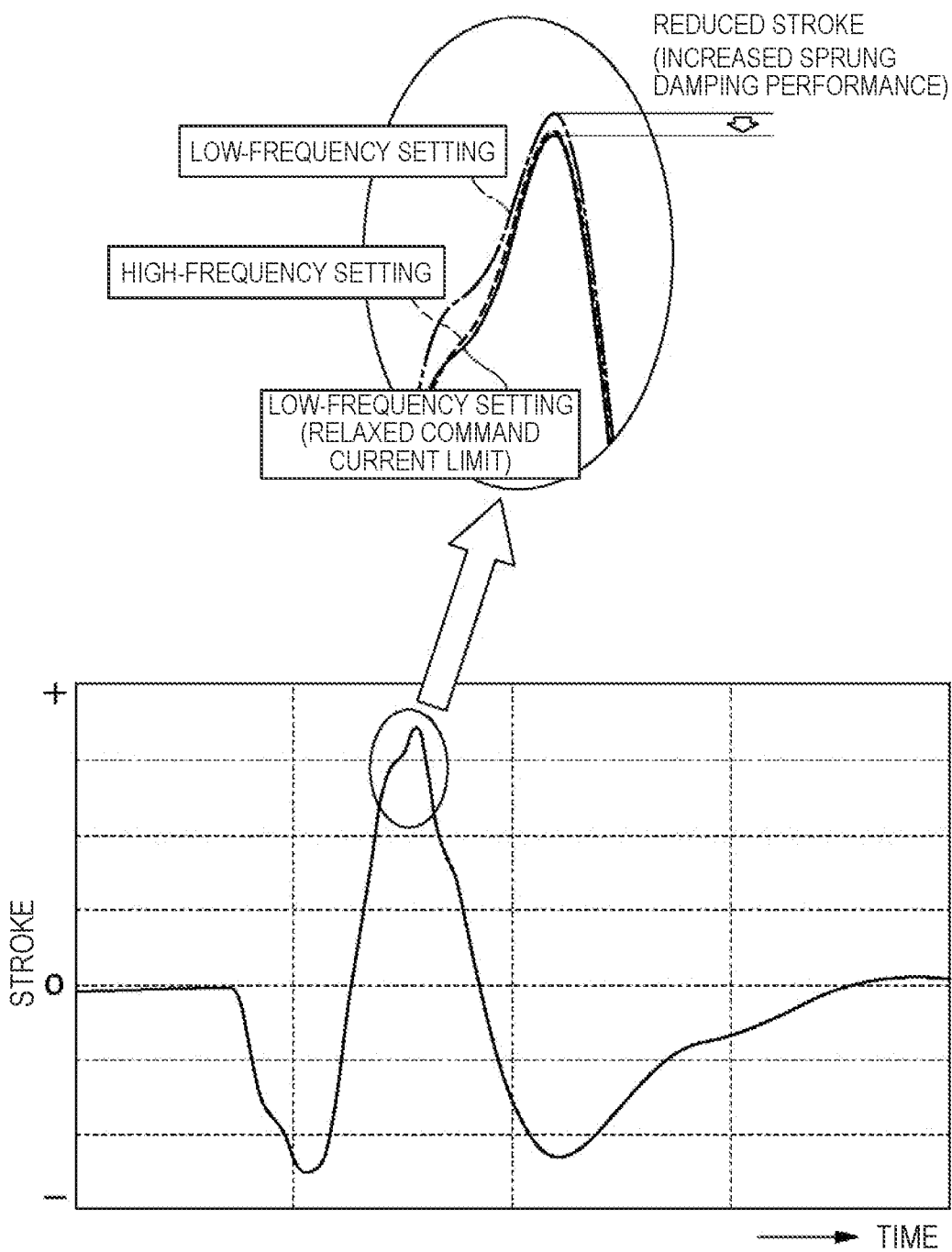
FIG. 5 is a characteristic graph for showing temporal changes in stroke of the variable damper for the first embodiment, the first comparative example, and a second comparative example.

In order to check the operation of the variable damper 5 by the controller 9, the current (drive current) supplied to the damping force variable actuator 6, the stroke (damper stroke) of the variable damper 5, and the like were obtained through simulation of the vehicle. Results thereof are shown in FIG. 3 to FIG. 5. FIG. 3 shows temporal changes in the damping force (target damping force) and the current (command current). FIG. 4 shows damping force trajectories (Lissajous waveforms) in accordance with the stroke of the variable damper 5. FIG. 5 shows temporal changes in stroke of the variable damper 5.

Broken lines of FIG. 3 to FIG. 5 show characteristics in a first comparative example. In the first comparative example, the cutoff frequency of the frequency response unit 7 is set to 20 Hz (high-frequency setting). In addition, in the first comparative example, the change rate of the command current (drive current) is always limited to a constant value. As a result, in the first comparative example, the control command calculation unit 17 limits the change rate of the command current such that, for example, the change rate is always a constant value (for example, the current limit value I1) regardless of the damper stroke X.

Solid lines of FIG. 3 to FIG. 5 show characteristics in the first embodiment. In this configuration, the cutoff frequency of the frequency response unit 7 is set to 10 Hz (low-frequency setting), and the controller 9 relaxes the limit on the change rate of the command current (drive current) in accordance with the damper stroke X.

As shown in FIG. 3, when the target damping force increases, the current (command current) supplied to the damping force variable actuator 6 increases. At this time, in the first embodiment, in addition to the low-frequency setting, the limit on the change rate of the command current is relaxed in accordance with the damper stroke X. Thus, compared with the first comparative example with the high-frequency setting, the current increases in a short time in the first embodiment. As a result, as shown in FIG. 4, in the first embodiment, even when the cutoff frequency fc of the frequency response unit 7 is set to, for example, 10 Hz (low-frequency setting), it is possible to raise the damping force in accordance with the change in damper stroke X at the same level as that in the first comparative example in which the cutoff frequency fc is set to, for example, 20 Hz (high-frequency setting).

In addition, as shown in FIG. 5, in the first embodiment, even when the cutoff frequency fc of the frequency response unit 7 is set to, for example, 10 Hz (low-frequency setting), it is possible to suppress the damper stroke (sprung behavior) at a level equal to or higher than that in the first comparative example in which the cutoff frequency fc is set to, for example, 20 Hz (high-frequency setting).

Moreover, a one-dot chain line of FIG. 5 indicates a characteristic in a second comparative example. In the second comparative example, the cutoff frequency of the frequency response unit 7 is set to 10 Hz (low-frequency setting). In addition, in the second comparative example, as in the first comparative example, the change rate of the command current (drive current) is always limited to a constant value. In this case, the change rate of the command current is limited to the constant value, and hence the stroke (damper stroke) of the variable damper 5 increases. Meanwhile, in the first embodiment, the stroke of the variable damper 5 is reduced and hence the sprung damping performance increases compared with the second comparative example in which the change rate of the command current is limited even in the low-frequency setting.

As described above, according to the first embodiment, the controller 9 increases the change rate of the damping force from the soft side to the hard side at the time of the control to achieve the target damping force when the frequency of the relative movement between the vehicle body 1 and the wheel 2 is the frequency (second frequency) lower than the cutoff frequency fc (first frequency) of the frequency response unit 7. That is, in the first embodiment, at the time of the low-frequency vibration, the change rate of the damping force from soft to hard is increased compared with that at the time of the high-frequency vibration having the frequency higher than that at the time of the low-frequency vibration. As a result, the controller 9 can increase the damping forces in accordance with the changes in damper strokes X at the time of the travel on a rough road in which the damper strokes X have low frequencies and large amplitudes.

Thus, also for the low-frequency vibration, the sprung behavior is suppressed, to thereby be capable of achieving good sprung damping performance. As a result, even when the cutoff frequency fc of the frequency response unit 7 is set to be lower, to thereby increase the improvement effect on the ride comfort by the frequency response unit 7, the contrary deterioration of the sprung damping performance can be suppressed. Moreover, in a usual shock absorber, when the change rate of the damping force from soft to hard is increased (switching speed is increased), noise of impact of hydraulic fluid of the shock absorber contrarily increases. Thus, in the usual shock absorber, the switching speed of the damping force cannot be increased. Meanwhile, the variable damper 5 includes the frequency response unit 7 formed of the free piston, and hence the noise of impact of hydraulic fluid is suppressed. Thus, in the variable damper 5 of the first embodiment, the change rate of the damping force from soft to hard can be increased.

The controller 9 according to the first embodiment relaxes the limit on the current value change rate of the current supplied to the damping force variable actuator 6 when the change rate of the damping force from the soft side to the hard side is increased. As a result, compared with the usual state in which the current value change rate is limited, the current supplied to the damping force variable actuator 6 can be increased in a short time, and hence the damping force generated by the variable damper 5 can be caused to quickly approach the target damping force.

The above-mentioned effect on the vehicle performance can be obtained not only in the vertical direction, but also in a roll direction and a pitch direction in the same principle. Thus, when the controller 9 according to the first embodiment is applied to roll vibration and pitch vibration, a roll behavior and a pitch behavior at a low frequency can be suppressed.

Figure 6:
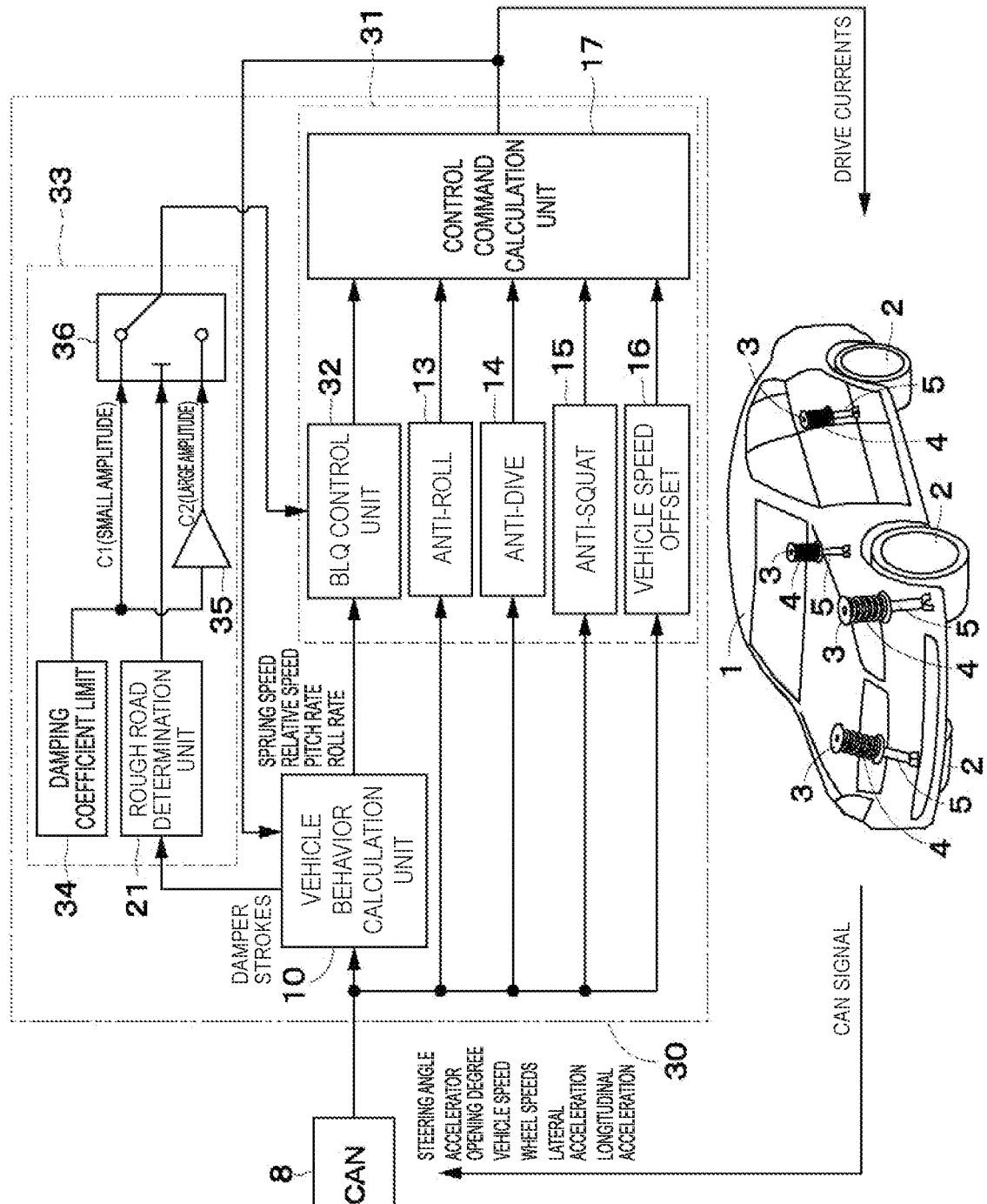
FIG. 6 is an overall configuration diagram for illustrating, together with a controller, a four-wheeled vehicle to which a suspension system according to a second embodiment of the present invention has been applied.

Next. FIG. 6 is illustration of a second embodiment of the present invention. The second embodiment has such a characteristic that the controller relaxes a limit on a damping coefficient of the variable damper when the change rate of the damping force from the soft side to the hard side is increased. In the second embodiment, the same components as those of the above-mentioned first embodiment are denoted by the same reference symbols, and description thereof is omitted.

A controller 30 according to the second embodiment is configured substantially similarly to the controller 9 in the first embodiment. An input side of the controller 30 is connected to the CAN 8, and an output side thereof is connected to the damping force variable actuators 6 of the variable dampers 5, and the like.

The controller 30 includes the vehicle behavior calculation unit 10, a damping force command signal output unit 31, and a damping coefficient control unit 33. The damping force command signal output unit 31 outputs the command signals for the currents to be supplied to the damping force variable actuators 6, based on the relative speeds (piston speeds) between the vehicle body 1 and the wheels 2, and on the vehicle behavior. The damping force command signal output unit 31 includes a BLQ control unit 32, the anti-roll control unit 13, the anti-dive control unit 14, the anti-squat control unit 15, the vehicle speed offset control unit 16, and the control command calculation unit 17.

The BLQ control unit 32 forms the ride comfort control unit which increases the ride comfort of the vehicle. The BLQ control unit 32 is configured similarly to the BLQ control unit 12 in the first embodiment. The BLQ control unit 32 outputs control command values based on the vehicle behavior output from the vehicle behavior calculation unit 10.

Specifically, the BLQ control unit 32 calculates a target damping coefficient based on the piston speed, the sprung speed, and the like of each wheel and calculates the control command value serving as the command signal for the current to each damping force variable actuator 6 from the target damping coefficient. In this configuration, the target damping coefficient is limited based on any one of a damping coefficient limit value C1 output from the damping coefficient control unit 33 and a product C2.

The damping coefficient control unit 33 increases the change rate of the damping force from the soft side to the hard side at the time of the control to achieve the target damping force when the frequency of the relative movement between the vehicle body 1 and the wheel 2 is the frequency (second frequency) lower than the cutoff frequency fc (first frequency) of the frequency response unit 7.

The damping coefficient control unit 33 increases the changer rate of the damping force from the soft side to the hard side at the time of the control to achieve the target damping force, based on the damper stroke of the variable damper 5. Specifically, the damping coefficient control unit 33 increases a limit value of the target damping coefficient at the time of the control to achieve the target damping force when the damper stroke X of the variable damper 5 is longer than the predetermined value X0 determined in advance (large amplitude) compared with that at the time when the damper stroke X is shorter (small amplitude). The damping coefficient control unit 33 includes the rough road determination unit 21, a damping coefficient limit unit 34, a gain multiplication unit 35, and a damping coefficient limit switching unit 36.

The damping coefficient limit unit 34 outputs the damping coefficient limit value C1 determined in advance. The damping coefficient limit value C1 is experimentally determined in consideration of, for example, the characteristics of the variable damper 5 and the behavior of the vehicle. The gain multiplication unit 35 multiplies the damping coefficient limit value C1 by a relaxation coefficient Cc, and outputs a product C2 thereof. In this configuration, the relaxation coefficient Cc is, for example, a positive real number (Cc>0).

To the damping coefficient limit switching unit 36, the damping coefficient limit value C1 output from the damping coefficient limit unit 34 and the product C2 obtained by multiplying the damping coefficient limit value C1 by the relaxation coefficient Cc are input. In addition thereto, to the damping coefficient limit switching unit 36, the determination result of the rough road determination unit 21 is input. The damping coefficient limit switching unit 36 selects any one of the damping coefficient limit value C1 and the product C2 in accordance with the determination result of the rough road determination unit 21, and outputs the selected one to the BLQ control unit 32. Specifically, the damping coefficient limit switching unit 36 outputs the damping coefficient limit value C1 when the rough road determination unit 21 determines that the travel road is a smooth road having a small amplitude. The damping coefficient limit switching unit 36 outputs the product C2 when the rough road determination unit 21 determines that the travel road is a rough road having a large amplitude.

The BLQ control unit 32 limits the target damping coefficient in accordance with the damping coefficient limit value C1 when the damping coefficient limit value C1 is output from the damping coefficient limit switching unit 36. The BLQ control unit 32 limits the target damping coefficient in accordance with the product C2 larger than the damping coefficient limit value C1 when the product C2 is output from the damping coefficient limit switching unit 36. In this configuration, the limit on the target damping coefficient is relaxed when the product C2 is output compared with that at the time of the output of the damping coefficient limit value C1. As a result, when the limit on the target damping coefficient is relaxed, compared with a case in which the limit is not relaxed, the change rate of the control command value output from the BLQ control unit 32 is large when the damping force is changed from the soft side to the hard side.

Figure 7:
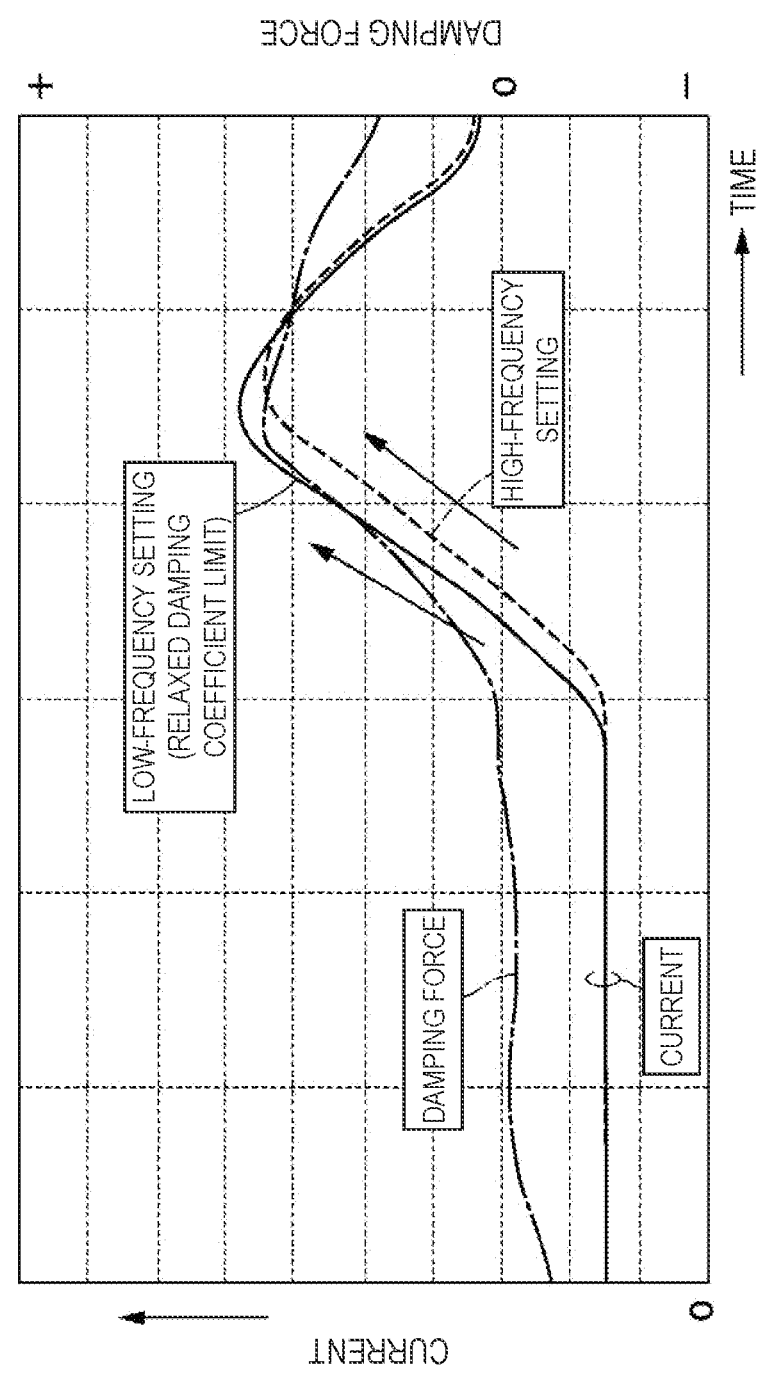
FIG. 7 is a characteristic graph for showing temporal changes in a damping force and a command current for the second embodiment and a third comparative example.
Figure 8:
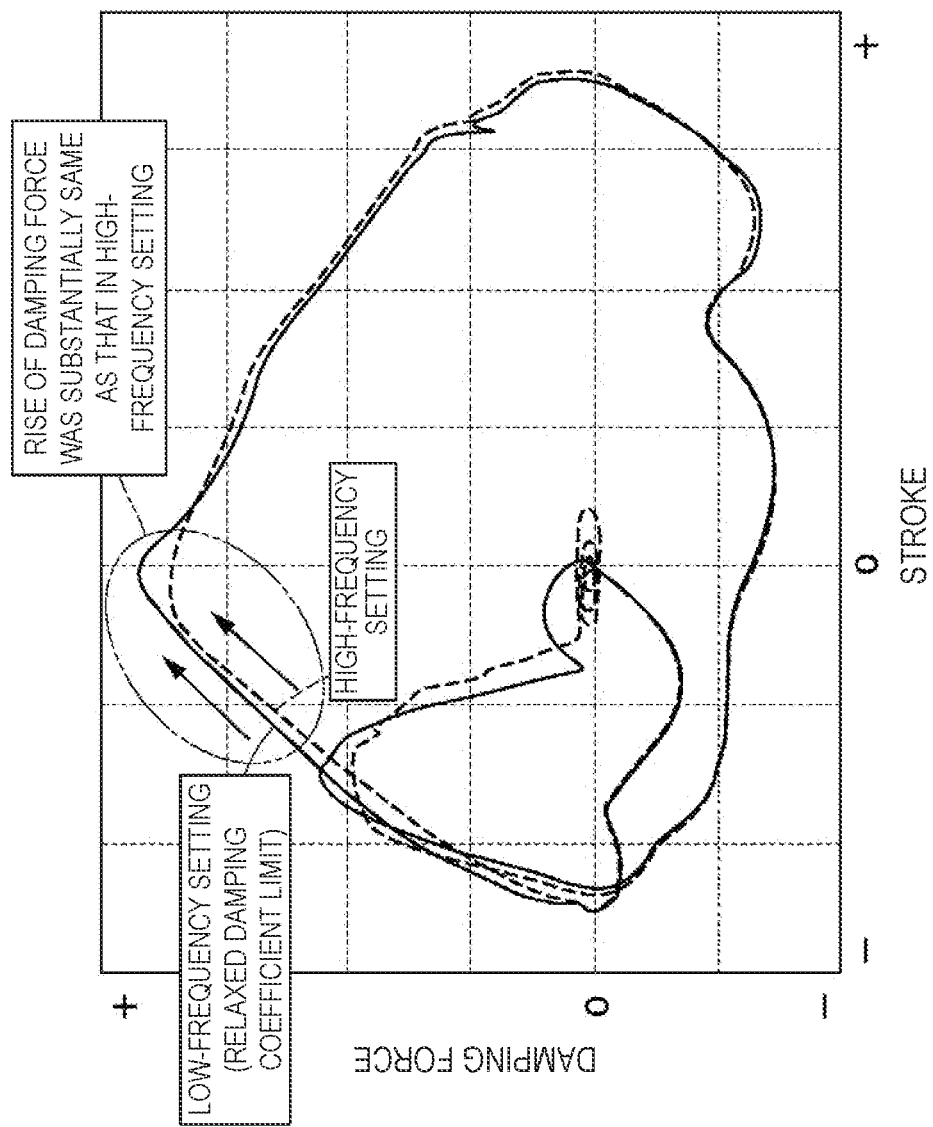
FIG. 8 is a characteristic graph for showing relationships between a stroke and a damping force of a variable damper for the second embodiment and the third comparative example.
Figure 9:
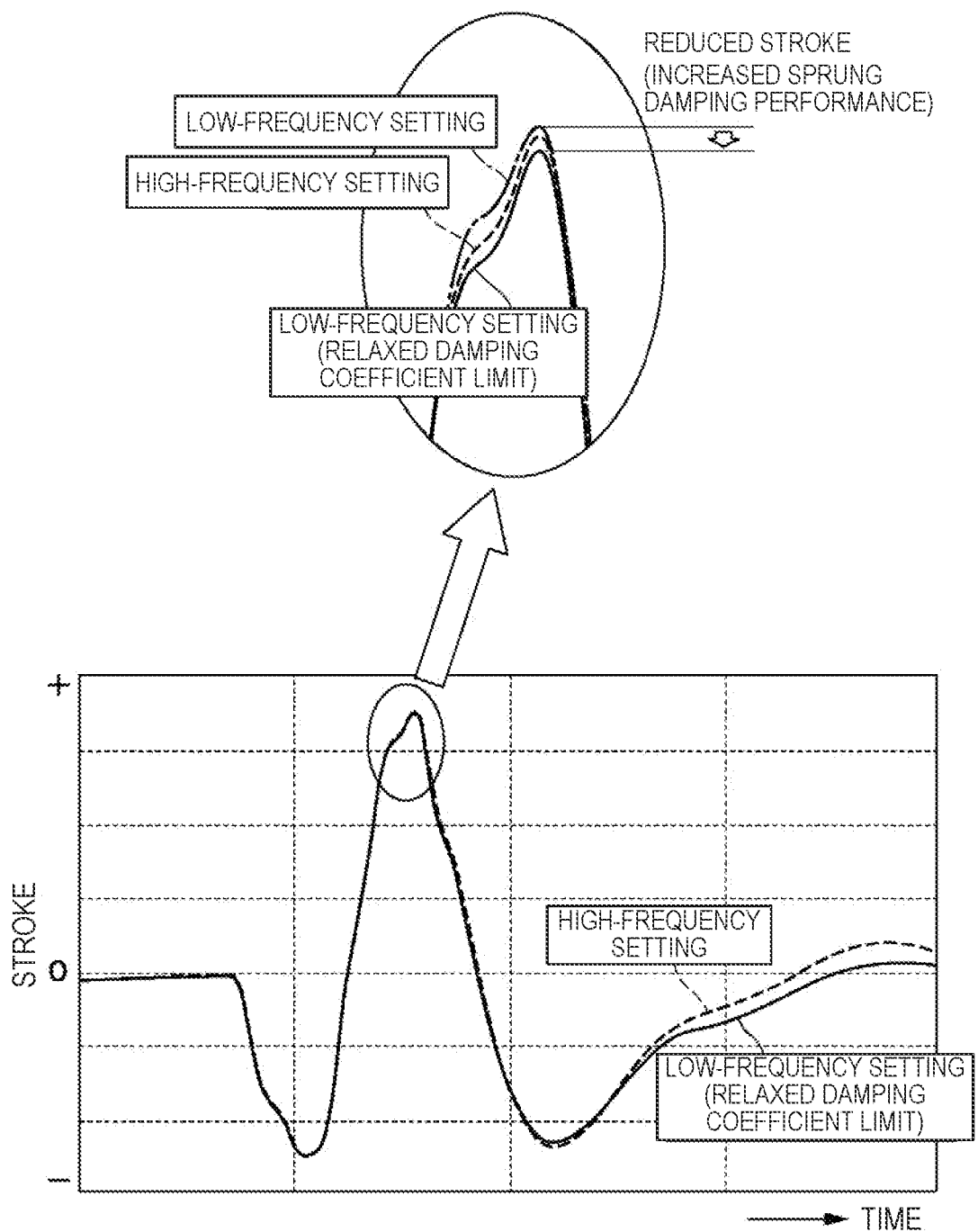
FIG. 9 is a characteristic graph for showing temporal changes in stroke of the variable damper for the second embodiment, the third comparative example, and a fourth comparative example.

In order to check the operation of the variable damper 5 by the controller 30, the current (drive current) to be supplied to the damping force variable actuator 6, the stroke (damper stroke) of the variable damper 5, and the like were obtained through simulation of the vehicle. Results thereof are shown in FIG. 7 to FIG. 9. FIG. 7 shows temporal changes in the damping force (target damping force) and the current (command current). FIG. 8 shows the damping force trajectories (Lissajous waveforms) in accordance with the stroke of the variable damper 5. FIG. 9 shows temporal changes in stroke of the variable damper 5.

Broken lines of FIG. 7 to FIG. 9 show characteristics in a third comparative example. In the third comparative example, the cutoff frequency of the frequency response unit 7 is set to 20 Hz (high-frequency setting). In addition, in the third comparative example, the target damping coefficient is always limited to a constant value. As a result, in the third comparative example, the BLQ control unit 32 limits the target damping coefficient such that, for example, the target damping coefficient is always a constant value (for example, the damping coefficient limit value C1) regardless of the damper stroke X.

Solid lines of FIG. 7 to FIG. 9 show characteristics in the second embodiment. In this state, the cutoff frequency of the frequency response unit 7 is set to 10 Hz (low-frequency setting), and the controller 30 relaxes the limit on the target damping coefficient in accordance with the damper stroke X.

As shown in FIG. 7, when the target damping force increases, the current (command current) supplied to the damping force variable actuator 6 increases. At this time, in the second embodiment, even in the low-frequency setting, the limit on the damping coefficient is relaxed in accordance with the damper stroke X. Thus, compared with the third comparative example with the high-frequency setting, the current increases in a short time in the second embodiment. As a result, as shown in FIG. 8, in the second embodiment, even when the cutoff frequency fc of the frequency response unit 7 is set to, for example, 10 Hz (low-frequency setting), it is possible to raise the damping force in accordance with the change in damper stroke X at the same level as that in the third comparative example in which the cutoff frequency fc is set to, for example, 20 Hz (high-frequency setting).

In addition, as shown in FIG. 9, in the second embodiment, even when the cutoff frequency fc of the frequency response unit 7 is set to, for example, 10 Hz (low-frequency setting), it is possible to suppress the damper stroke (sprung behavior) at a level equal to or higher than that in the third comparative example in which the cutoff frequency fc is set to, for example, 20 Hz (high-frequency setting).

Moreover, a one-dot chain line of FIG. 9 indicates a characteristic in a fourth comparative example. In the fourth comparative example, the cutoff frequency of the frequency response unit 7 is set to 10 Hz (low-frequency setting). In addition, in the fourth comparative example, as in the third comparative example, the target damping coefficient is always limited to a constant value. In this case, the damping coefficient is limited to the constant value, and hence the stroke (damper stroke) of the variable damper 5 increases. Meanwhile, in the second embodiment, the stroke of the variable damper 5 is reduced and the sprung damping performance increases compared with the fourth comparative example in which the damping coefficient is limited even in the low-frequency setting.

Accordingly, also in the second embodiment configured as described above, there can be provided the actions and the effects similar to those in the first embodiment.

The controller 30 according to the second embodiment relaxes the limit on the damping coefficient of the variable damper 5 when the change rate of the damping force from the soft side to the hard side is increased. Accordingly, the controller 30 according to the second embodiment can quickly increase the damping forces of the variable dampers 5 at the time of the travel on a rough road in which the damper strokes X have low frequencies and large amplitudes. As a result, as shown in FIG. 8, even when the cutoff frequency fc of the frequency response unit 7 is set to, for example, 10 Hz, it is possible to raise the damping forces in accordance with the change in damper strokes X at the same level as that in the case in which the cutoff frequency fc is set to, for example, 20 Hz. In addition, as shown in FIG. 9, even when the cutoff frequency fc of the frequency response unit 7 is set to, for example, 10 Hz, it is possible to suppress the damper stroke (sprung behavior) at a level equal to or higher than that in the case in which the cutoff frequency fc is set to, for example, 20 Hz.

Figure 10:
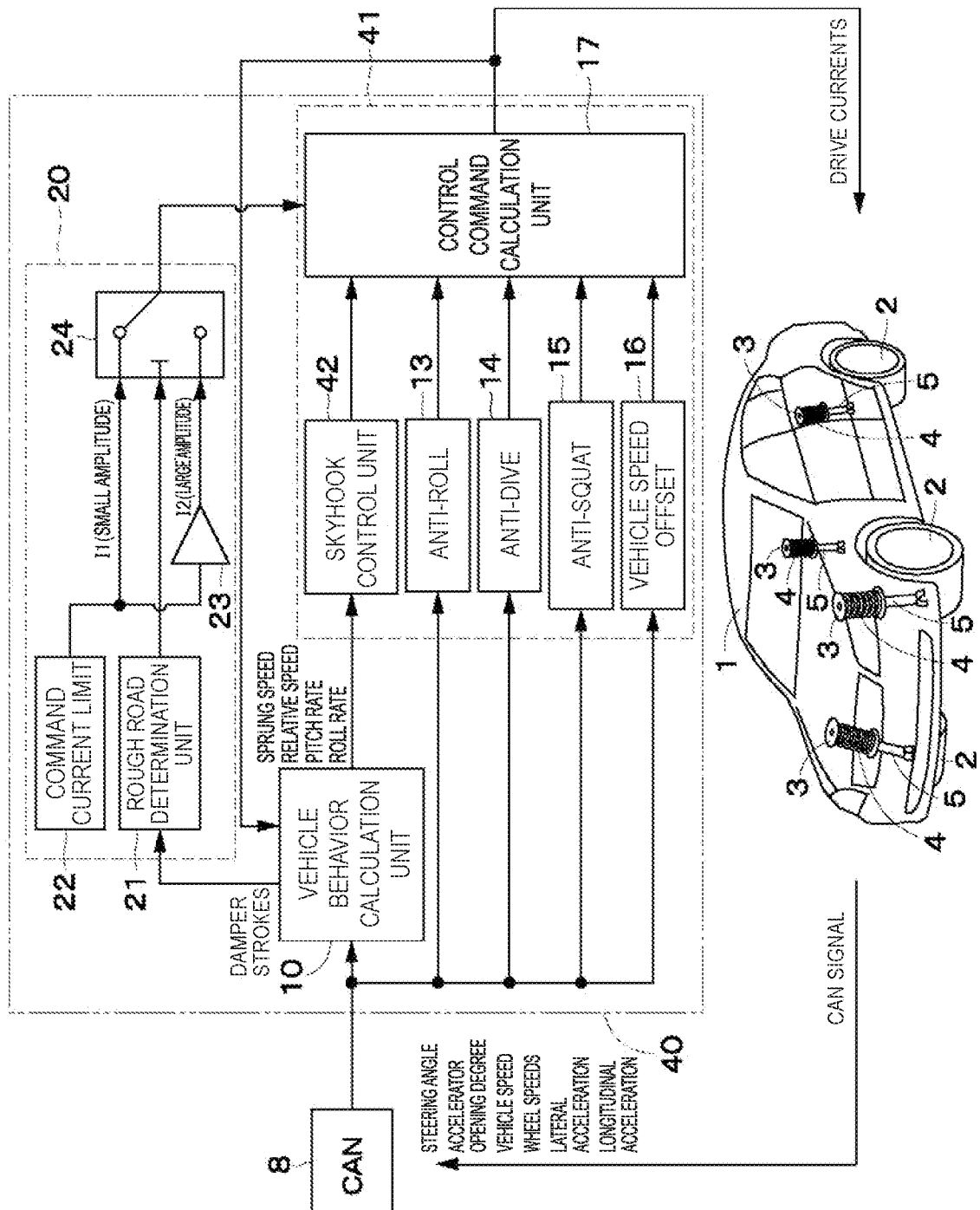
FIG. 10 is an overall configuration diagram for illustrating, together with a controller, a four-wheeled vehicle to which a suspension system according to a third embodiment of the present invention has been applied.

Next, FIG. 10 is illustration of a third embodiment of the present invention. The third embodiment has such a characteristic that a skyhook control unit is used to obtain control command values for increasing the ride comfort. In the third embodiment, the same components as those of the above-mentioned first embodiment are denoted by the same reference symbols, and description thereof is omitted.

A controller 40 according to the third embodiment is configured substantially similarly to the controller 9 according to the first embodiment. An input side of the controller 40 is connected to the CAN 8 and the like, and an output side thereof is connected to the damping force variable actuators 6 of the variable dampers 5, and the like.

The controller 40 includes the vehicle behavior calculation unit 10, a damping force command signal output unit 41, and the damping force change rate control unit 20. The damping force command signal output unit 41 outputs the command signals (command currents) for the drive currents to the damping force variable actuators 6 based on the relative speeds (piston speeds) between the vehicle body 1 and the wheels 2, and on the vehicle behavior. The damping force command signal output unit 41 includes a skyhook control unit 42, the anti-roll control unit 13, the anti-dive control unit 14, the anti-squat control unit 15, the vehicle speed offset control unit 16, and the control command calculation unit 17. The skyhook control unit 42 is provided, in place of the BLQ control unit 12 in the first embodiment, to the damping force command signal output unit 41. The skyhook control unit 42 forms the ride comfort control unit which increases the ride comfort of the vehicle. The skyhook control unit 42 outputs control command values based on the vehicle behavior output from the vehicle behavior calculation unit 10. Specifically, the skyhook control unit 42 calculates the control command value serving as the command signal for the current to each damping force variable actuator 6 based on the piston speed, the sprung speed, and the like of each wheel. The skyhook control unit 42 outputs the control command value for reducing the sprung vertical vibration from the stroke speed, the sprung speed, and the like to the control command calculation unit 17 based on, for example, the skyhook control theory.

Accordingly, also in the third embodiment configured as described above, there can be provided the actions and the effects similar to those in the first embodiment.

In the third embodiment, description is given with the exemplary case in which the controller 40 includes the skyhook control unit 42 as the ride comfort control unit. However, the present invention is not limited to this case, and the ride comfort control unit may execute, for example, the H∞ control, or may execute various types of feedback control.

Figure 11:
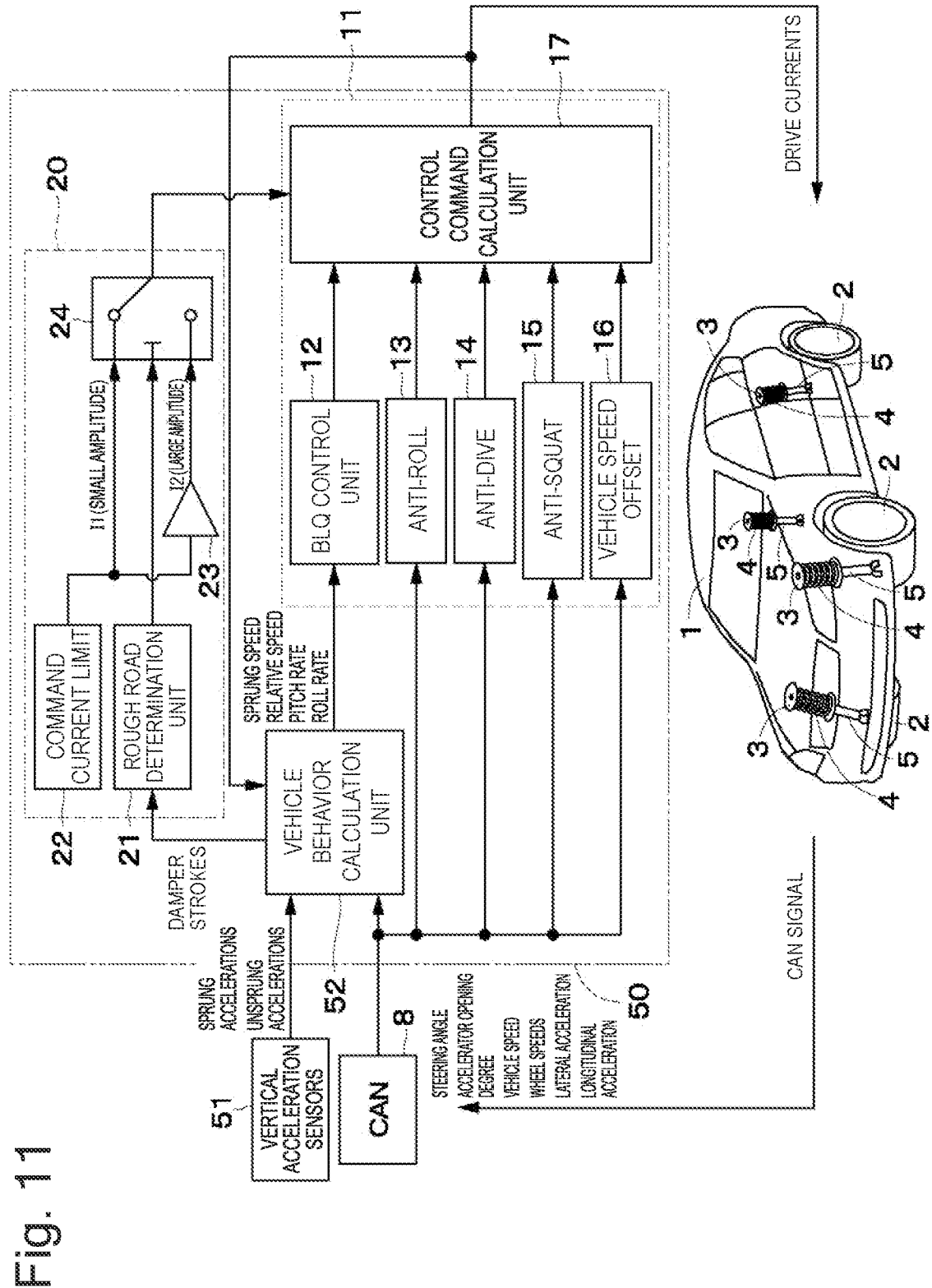
FIG. 11 is an overall configuration diagram for illustrating, together with a controller, a four-wheeled vehicle to which a suspension system according to a fourth embodiment of the present invention has been applied.

Next. FIG. 11 is illustration of a fourth embodiment of the present invention. The fourth embodiment has such a characteristic that the vehicle behavior is estimated based on sprung accelerations acquired from sprung acceleration sensors in addition to the vehicle operation information acquired from the CAN by the vehicle behavior calculation unit. In the fourth embodiment, the same components as those of the above-mentioned first embodiment are denoted by the same reference symbols, and description thereof is omitted.

A controller 50 according to the fourth embodiment is configured substantially similarly to the controller 9 according to the first embodiment. An input side of the controller 50 is connected to the CAN 8 and vertical acceleration sensors 51, and an output side thereof is connected to the damping force variable actuators 6 of the variable dampers 5, and the like.

The vertical acceleration sensors 51 are provided to the vehicle body 1, and detect vibration accelerations in the vertical direction. For example, a total of five vertical acceleration sensors 51 including three on the sprung side and two on the unsprung side are provided. In this case, the sprung vertical acceleration sensors SI are mounted to the vehicle body 1 at positions in vicinities of top end sides of the variable dampers 5 for the left front wheel and the right front wheel and to the vehicle body 1 at an intermediate position between the left and right rear wheels. The unsprung vertical acceleration sensors 51 are mounted on the unsprung sides of the left front wheel and the right front wheel. The vertical acceleration sensors 51 serve as the vehicle vibration acquisition means each of which acquires the vibration between the vehicle body 1 and each wheel 2.

The controller 50 includes a vehicle behavior calculation unit 52, the damping force command signal output unit 11, and the damping force change rate control unit 20. The vehicle behavior calculation unit 52 is configured substantially similarly to the vehicle behavior calculation unit 10 in the first embodiment. However, to the vehicle behavior calculation unit 52, the vehicle operation information is input from the CAN 8, and the sprung accelerations and the unsprung accelerations are input from the vertical acceleration sensors 51. The vehicle behavior calculation unit 52 outputs a vehicle behavior estimated based on the information input from the CAN 8 and the vertical acceleration sensors 51. Specifically, the vehicle behavior calculation unit 52 acquires, from the CAN 8, the steering angle, the accelerator opening degree, the vehicle speed, the wheel speeds, the lateral acceleration, the longitudinal acceleration, and the like and acquires the sprung and unsprung vibration accelerations in the vertical direction from the vertical acceleration sensors 51. The vehicle behavior calculation unit 52 acquires the relative speed (piston speed) of each wheel based on those pieces of information. The vehicle behavior calculation unit 52 estimates the damping force generated by the variable damper 5 based on the piston speed and the command current, similarly to the vehicle behavior calculation unit 10 in the first embodiment. Moreover, the vehicle behavior calculation unit 52 estimates the damper stroke X of each variable damper 5 based on the information input from the CAN 8 and the sprung accelerations and the unsprung accelerations input from the vertical acceleration sensors 51.

Accordingly, also in the fourth embodiment configured as described above, there can be provided the actions and the effects similar to those in the first embodiment.

In the fourth embodiment, description is given with the exemplary case in which the suspension system is provided with the three vertical acceleration sensors 51 serving as the vehicle vibration acquisition means on the sprung side. The present invention is not limited to this case, and the vertical acceleration sensor may be provided to, for example, each of the left and right front wheel sides and the left and right rear wheel sides, and hence the suspension system may include a total of four sprung vertical acceleration sensors. Moreover, the vehicle vibration acquisition means is not limited to the vertical acceleration sensor, and may be various sensors, for example, a vehicle height sensor, a wheel speed sensor, and a steering angle sensor. The vehicle vibration acquisition means may be a camera sensing device, for example, a stereo camera capable of measuring a travel surface of the vehicle.

Figure 12:
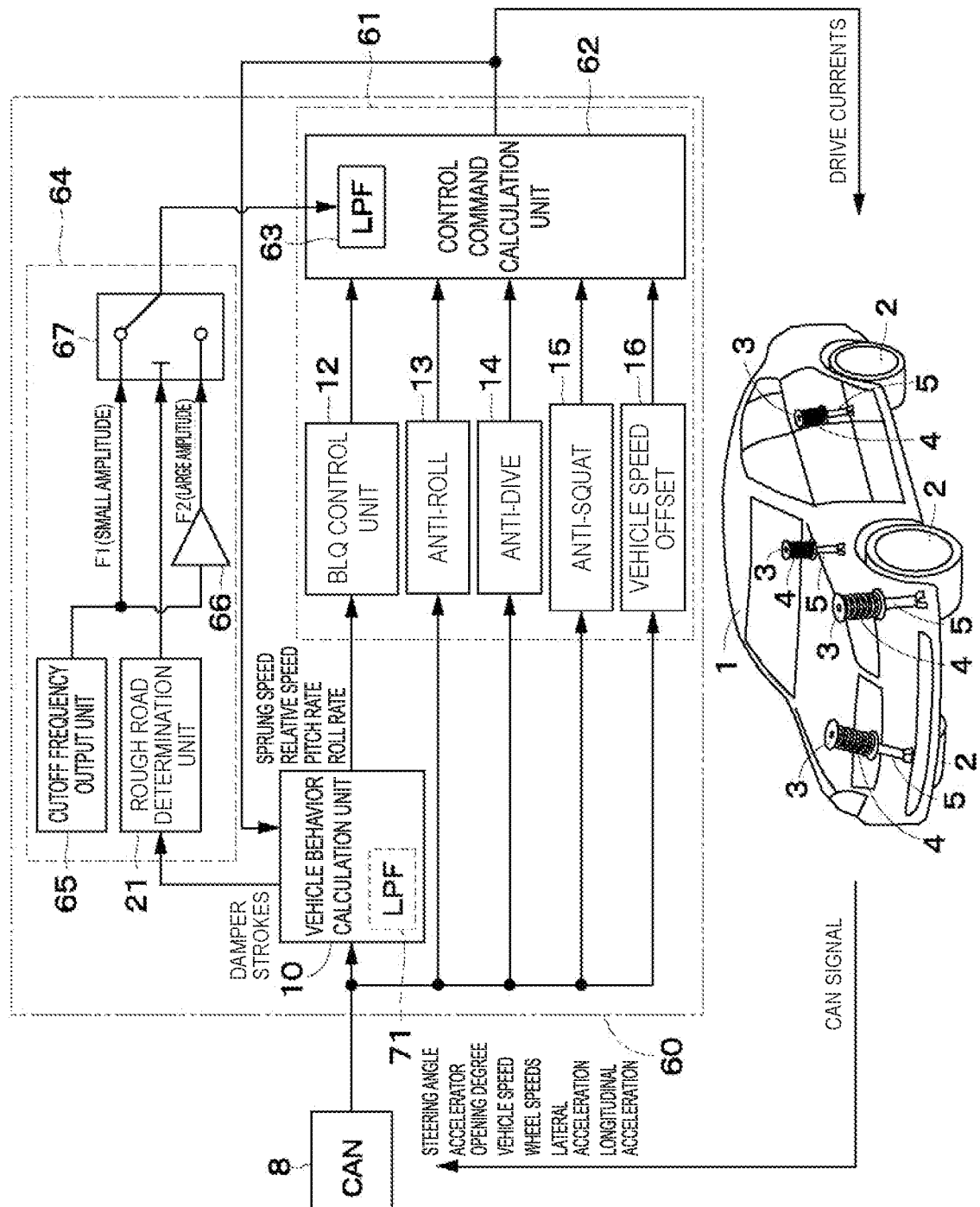
FIG. 12 is an overall configuration diagram for illustrating, together with a controller, a four-wheeled vehicle to which a suspension system according to a fifth embodiment of the present invention has been applied.

Next, FIG. 12 is illustration of a fifth embodiment of the present invention. The fifth embodiment has such a characteristic that the controller includes a low-pass filter which attenuates a high-frequency component of each output signal, and a cutoff frequency of the low-pass filter is increased when the change rate of the damping force is increased from the soft side to the hard side. In the fifth embodiment, the same components as those of the above-mentioned first embodiment are denoted by the same reference symbols, and description thereof is omitted.

A controller 60 according to the fifth embodiment is configured substantially similarly to the controller 9 according to the first embodiment. An input side of the controller 60 is connected to the CAN 8 and the like, and an output side thereof is connected to the damping force variable actuators 6 of the variable dampers 5, and the like.

The controller 60 includes the vehicle behavior calculation unit 10, a damping force command signal output unit 61, and a cutoff frequency control unit 64. The damping force command signal output unit 61 outputs the command signals (command currents) for the drive currents to the damping force variable actuators 6 based on the relative speeds (piston speeds) between the vehicle body 1 and the wheels 2, and on the vehicle behavior. The damping force command signal output unit 61 includes the BLQ control unit 12, the anti-roll control unit 13, the anti-dive control unit 14, the anti-squat control unit 15, the vehicle speed offset control unit 16, and a control command calculation unit 62.

The control command calculation unit 62 is configured similarly to the control command calculation unit 17 in the first embodiment. To an input side of the control command calculation unit 62, the BLQ control unit 12, the anti-roll control unit 13, the anti-dive control unit 14, the anti-squat control unit 15, and the vehicle speed offset control unit 16 are connected. The control command calculation unit 62 calculates the command current as the command signal for the damping force to be output to the damping force variable actuator 6 of each variable damper 5, based on the control command values from the BLQ control unit 12, the anti-roll control unit 13, the anti-dive control unit 14, the anti-squat control unit 15, and the vehicle speed offset control unit 16 connected to each other in parallel. The damping force variable actuator 6 of each variable damper 5 variably controls the damping force characteristic continuously or at a plurality of steps between the hard and the soft in accordance with the command current serving as the drive current supplied from the control command calculation unit 62.

The control command calculation unit 62 includes a low-pass filter 63 (hereinafter referred to as "LPF 63"). The LPF 63 attenuates a signal of the command signals which is at a frequency higher than a cutoff frequency fL, and allows a signal of the command signals which is at a frequency lower than the cutoff frequency fL to pass. As a result, the control command calculation unit 62 outputs the command signals (command currents) each formed of a low-frequency component lower than the cutoff frequency fL.

The cutoff frequency control unit 64 increases the change rate of the damping force from the soft side to the hard side at the time of the control to achieve the target damping force when the frequency of the relative movement between the vehicle body 1 and the wheel 2 is the frequency (second frequency) lower than the cutoff frequency fc (first frequency) of the frequency response unit 7.

The cutoff frequency control unit 64 increases the changer rate from the soft side to the hard side at the time of the control to achieve the target damping force based on the damper stroke X of the variable damper 5. Specifically, the cutoff frequency control unit 64 increases the cutoff frequency fL of the LPF 63 when the damper stroke X of the variable damper 5 is longer than the predetermined value X0 determined in advance (large amplitude) compared with that at the time when the damper stroke X is shorter (small amplitude). The cutoff frequency control unit 64 includes the rough road determination unit 21, a cutoff frequency output unit 65, a gain multiplication unit 66, and a cutoff frequency switching unit 67.

The cutoff frequency output unit 65 outputs a set value F1 determined in advance. The set value F1 is experimentally determined in consideration of, for example, the characteristics of the variable damper 5 and the behavior of the vehicle. The gain multiplication unit 66 multiplies the set value F1 by a relaxation coefficient CL, and outputs a product F2 thereof. In this configuration, the relaxation coefficient CL is, for example, a positive real number (CL>0).

To the cutoff frequency switching unit 67, the set value F1 output from the cutoff frequency output unit 65 and the product F2 obtained by multiplying the set value F1 by the relaxation coefficient CL are input. In addition thereto, to the cutoff frequency switching unit 67, the determination result of the rough road determination unit 21 is input. The cutoff frequency switching unit 67 selects any one of the set value F1 and the product F2 in accordance with the determination result of the rough road determination unit 21, and outputs the selected one to the control command calculation unit 62. Specifically, the cutoff frequency switching unit 67 outputs the set value F1 when the rough road determination unit 21 determines that the travel road is a smooth road having a small amplitude. The cutoff frequency switching unit 67 outputs the product F2 when the rough road determination unit 21 determines that the travel road is a rough road having a large amplitude.

The control command calculation unit 62 sets the cutoff frequency fL of the LPF 63 to the set value F1 when the set value F1 is output from the cutoff frequency switching unit 67. As a result, the control command calculation unit 62 outputs a low-frequency component having a frequency lower than the set value F1 from each command signal.

The control command calculation unit 62 sets the cutoff frequency fL of the LPF 63 to the product F2 when the product F2 is output from the cutoff frequency switching unit 67. As a result, the control command calculation unit 62 outputs a low-frequency component having a frequency lower than the product F2 from each command signal. In this configuration, the limit on the command signals is relaxed when the product F2 is output compared with that at the time of the output of the set value F1. As a result, when the limit on the command signals is relaxed, compared with a case in which the limit is not relaxed, the change rate of the control command value output from the control command calculation unit 62 is large when the damping force is changed from the soft side to the hard side.

Accordingly, also in the fifth embodiment configured as described above, there can be provided the actions and the effects substantially similar to those in the first embodiment.

The controller 60 according to the fifth embodiment increases the cutoff frequency fL of the LPF 63 when the change rate of the damping force from the soft side to the hard side is increased. As a result, the controller 60 according to the fifth embodiment can output the high-frequency components of the control commands, to thereby be capable of quickly increasing the damping forces of the variable dampers 5 at the time of the travel on a rough road in which the damper strokes X have low frequencies and large amplitudes compared with those at the time of the travel on a smooth road.

The fifth embodiment is configured such that the control command calculation unit 62 includes the LPF 63, and the cutoff frequency control unit 64 switches the cutoff frequency fL of the LPF 63. The present invention is not limited to this configuration. As illustrated in FIG. 12, for example, a low-pass filter 71 (hereinafter referred to as "LPF 71") capable of changing the cutoff frequency may be provided to the vehicle behavior calculation unit 10. The LPF 71 attenuates a high-frequency component of an input signal (signal of the vehicle operation information) which is at a frequency higher than the cutoff frequency, and allows a low-frequency component to pass. In this configuration, the cutoff frequency of the LPF 71 is switched by the cutoff frequency control unit 64.

In the first embodiment, the damping force command signal output unit 11 includes, in addition to the BLQ control unit 12 serving as the ride comfort control unit, the anti-roll control unit 13, the anti-dive control unit 14, and the anti-squat control unit 15 which serve as the maneuverability and stability control unit, and further includes the vehicle speed offset control unit 16. The present invention is not limited to this configuration, and any one of the anti-roll control unit, the anti-dive control unit, the anti-squat control unit, and the vehicle speed offset control unit may be omitted from the damping force command signal output unit, or all thereof may be omitted. That is, the damping force command signal output unit may include only the ride comfort control unit. This configuration may also be applied to the second embodiment to the fifth embodiment.

In each of the embodiments, it is assumed that the controller 9 (rough road determination unit 21) discriminates the time at which the frequency of the relative movement between the vehicle body 1 and the wheel 2 is the low frequency (second frequency) compared with the cutoff frequency fc (first frequency) of the frequency response unit 7 based on the damper stroke X. The present invention is not limited to this configuration, and the controller may discriminate a time at which the frequency of the relative movement between the vehicle body and the wheel is the second frequency lower than the first frequency based on the relative speed (piston speed or damper speed) or the relative displacement between the vehicle body and the wheel.

In each of the embodiments, description is given with the exemplary case of the suspension system to be used for a four-wheeled automobile. The present invention is not limited to this example, and can be also applied to, for example, a two-wheeled automobile or a three-wheeled automobile, or a truck, a bus, or the like, which is a service vehicle or a transport vehicle.

Each of the embodiments is only an example, and the configurations described in different embodiments can be partially replaced or combined.

Next, as the suspension system encompassed in the embodiments, for example, the following aspects are conceivable.

According to a first aspect, a suspension system includes: a shock absorber that includes a damping force variable mechanism configured to use an actuator to adjust communication of working fluid generated in a passage by a relative movement between a vehicle body and a wheel, to thereby adjust a damping force over a range of a soft characteristic to a hard characteristic; and a controller configured to control the actuator. The shock absorber further includes a frequency response unit configured to reduce the damping force for vibration at a specific frequency. The controller is configured to increase a change rate from a soft side to a hard side at a time of controlling the damping force to reach a target damping force when a frequency of the relative movement between the vehicle body and the wheel is lower than a first frequency set to the frequency response unit.

With this configuration, the controller increases the change rate of the damping force from the soft side to the hard side in accordance with the relative movement between the vehicle body and the wheel when the frequency of the relative movement between the vehicle body and the wheel is a second frequency compared with that at a time at which the frequency is higher than the first frequency. As a result, also for low-frequency vibration, a sprung behavior is suppressed, to thereby be capable of achieving good sprung damping performance.

According to a second aspect, in the first aspect, the controller is configured to relax a limit on a current value change rate of a current supplied to the actuator when the change rate is increased. With this configuration, compared with a usual state in which the current value change rate is limited, the current supplied to the actuator can be increased in a short time. As a result, the damping force generated by the shock absorber can be caused to quickly approach the target damping force.

According to a third aspect, in the first aspect, the controller is configured to relax a limit on a damping coefficient of the damping force variable mechanism when the change rate is increased. With this configuration, the damping force generated by the shock absorber can quickly be increased when the limit on the damping coefficient is relaxed compared with that at a time at which the damping coefficient is limited.

According to a fourth aspect, in the first aspect, the controller includes a low-pass filter configured to attenuate a high-frequency component of an input signal or an output signal, and is configured to increase a cutoff frequency of the low-pass filter when the change rate is increased.

For example, when the low-pass filter is provided on an output side of the controller, responsiveness of the actuator can be increased when the cutoff frequency of the low-pass filter is high compared with that at a time of a low cutoff frequency. Thus, the damping force generated by the shock absorber can quickly be increased when the cutoff frequency of the low-pass filter is high compared with that at the time of a low cutoff frequency. This effect can similarly be provided in a case in which the low-pass filter is provided, for example, on an input side of the controller.

According to a fifth aspect, in the first aspect, the controller is configured to increase the change rate from the soft side to the hard side at the time of controlling the damping force to reach the target damping force for a low cutoff frequency of the frequency response unit compared with a high cutoff frequency thereof.

With this configuration, for the low cutoff frequency of the frequency response unit, an improvement effect on ride comfort by the frequency response unit can be increased. Moreover, for the low cutoff frequency of the frequency response unit, the damping force can be raised in accordance with the relative movement between the vehicle body and the wheel at the same level as that at the time of the high cutoff frequency. In addition, for the low cutoff frequency of the frequency response unit, a sprung behavior can be suppressed at a level equal to or higher than that at the time of the high cutoff frequency.

According to a sixth aspect, a controller is configured to: control a damping force variable mechanism of a shock absorber including a frequency response unit configured to reduce a damping force for vibration at a specific frequency, the damping force variable mechanism being configured to use an actuator to adjust communication of working fluid generated in a passage by a relative movement between a vehicle body and a wheel, to thereby adjust the damping force over a range of a soft characteristic to a hard characteristic; and reduce a time for the damping force to reach from a target damping force on a soft side to that on a hard side when a frequency of the relative movement between the vehicle body and the wheel is lower than a first frequency set to the frequency response unit.

With this configuration, the controller can cause the damping force generated by the shock absorber to quickly approach the target damping force when the frequency of the relative movement between the wheel and the vehicle body is the second frequency compared with that at the time of the frequency higher than the first frequency. As a result, also for the low-frequency vibration, the sprung behavior is suppressed, to thereby be capable of achieving the good sprung damping performance.

Note that, the present invention is not limited to the embodiments described above, and includes further various modification examples. For example, in the embodiments described above, the configurations are described in detail in order to clearly describe the present invention, and the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2021-159589 filed on Sep. 29, 2021. All disclosed contents including Specification, Scope of Claims, Drawings, and Abstract of Japanese Patent Application No. 2021-159589 filed on Sep. 29, 2021 are incorporated herein by reference in their entirety.

REFERENCE SIGNS LIST

1: vehicle body. 2: wheel, 3: suspension device, 5: variable damper (shock absorber), 6: damping force variable actuator (actuator, damping force variable mechanism), 7: frequency response unit, 9, 30, 40, 50, 60: controller, 10, 52: vehicle behavior calculation unit, 11, 31, 41, 61: damping force command signal output unit, 12, 32: BLQ control unit, 17, 62: control command calculation unit, 20: damping force change rate control unit, 21: rough road determination unit, 24: current limit switching unit, 33: damping coefficient control unit, 36: damping coefficient limit switching unit, 42: skyhook control unit, 51: vertical acceleration sensor, 63, 71: low-pass filter (LPF), 64: cutoff frequency control unit, 67: cutoff frequency switching unit

The invention claimed is:

1. A suspension system, comprising:
a shock absorber that includes a damping force variable mechanism configured to use an actuator to adjust communication of working fluid generated in a passage by a relative movement between a vehicle body and a wheel, to thereby adjust a damping force over a range of a soft characteristic to a hard characteristic; and
a controller configured to control the actuator,
wherein the shock absorber further includes a frequency response unit configured to reduce the damping force for vibration at a specific frequency, and
wherein the controller is configured to reduce a time for the damping force to reach from a target damping force on a soft side to that on a hard side when a frequency of the relative movement between the vehicle body and the wheel is lower than a first frequency set to the frequency response unit.

2. A suspension system, comprising:
a shock absorber that includes a damping force variable mechanism configured to use an actuator to adjust communication of working fluid generated in a passage by a relative movement between a vehicle body and a wheel, to thereby adjust a damping force over a range of a soft characteristic to a hard characteristic; and
a controller configured to control the actuator,
wherein the shock absorber further includes a frequency response unit configured to reduce the damping force for vibration at a specific frequency, and
wherein the controller is configured to increase a change rate from a soft side to a hard side at a time of controlling the damping force to reach a target damping force when a frequency of the relative movement between the vehicle body and the wheel is lower than a first frequency set to the frequency response unit, and
wherein the controller is configured to relax a limit on a damping coefficient of the damping force variable mechanism when the change rate is increased.

3. The suspension system according to claim 2, wherein the controller is configured to relax a limit on a current value change rate of a current supplied to the actuator when the change rate is increased.

4. The suspension system according to claim 2, wherein the controller is configured to increase the change rate from the soft side to the hard side at the time of controlling the damping force to reach the target damping force for a low cutoff frequency of the frequency response unit compared with a high cutoff frequency thereof.

5. A suspension system, comprising:
a shock absorber that includes a damping force variable mechanism configured to use an actuator to adjust communication of working fluid generated in a passage by a relative movement between a vehicle body and a wheel, to thereby adjust a damping force over a range of a soft characteristic to a hard characteristic; and
a controller configured to control the actuator,
wherein the shock absorber further includes a frequency response unit configured to reduce the damping force for vibration at a specific frequency, and
wherein the controller is configured to increase a change rate from a soft side to a hard side at a time of controlling the damping force to reach a target damping force when a frequency of the relative movement between the vehicle body and the wheel is lower than a first frequency set to the frequency response unit, and
wherein the controller includes a low-pass filter configured to attenuate a high-frequency component of an input signal or an output signal, and is configured to increase a cutoff frequency of the low-pass filter when the change rate is increased.

6. The suspension system according to claim 5, wherein the controller is configured to relax a limit on a current value change rate of a current supplied to the actuator when the change rate is increased.

7. The suspension system according to claim 5, wherein the controller is configured to increase the change rate from the soft side to the hard side at the time of controlling the damping force to reach the target damping force for a low cutoff frequency of the frequency response unit compared with a high cutoff frequency thereof.

8. A controller, which is configured to:
control a damping force variable mechanism of a shock absorber including a frequency response unit configured to reduce a damping force for vibration at a specific frequency, the damping force variable mechanism being configured to use an actuator to adjust communication of working fluid generated in a passage by a relative movement between a vehicle body and a wheel, to thereby adjust the damping force over a range of a soft characteristic to a hard characteristic; and
reduce a time for the damping force to reach from a target damping force on a soft side to that on a hard side when a frequency of the relative movement between the vehicle body and the wheel is lower than a first frequency set to the frequency response unit.

\* \* \* \* \*